Dec. 22, 1959 H. M. HUME 2,918,524

TELEVISION PROGRAM CONTROL

Filed June 15, 1956 2 Sheets-Sheet 1

INVENTOR
HENRY M. HUME
BY
Pennie, Edmonds, Morton, Barrows & Taylor
ATTORNEYS

TELEVISION PROGRAM CONTROL

Filed June 15, 1956

2 Sheets-Sheet 2

INVENTOR
HENRY M. HUME
BY
Bruce Edwards Hodan Barrows & Taylor
ATTORNEYS 2,918,524

TELEVISION PROGRAM CONTROL

Henry M. Hume, Brooklyn, N.Y.

Application June 15, 1956, Serial No. 591,594
16 Claims. (Cl. 178—5.6)

This invention relates to television broadcasting and more particularly to the selection and presentation for transmission of a desired aspect of a scene of action being televised. It is customary in television broadcasting to employ a plurality of pick-up cameras which view the action from different angles or points of vantage and which generate separate video signals. A single audio sound signal may be generated for transmission with whichever of the video signals is selected, or plural sound signals may be generated, one for each of the television cameras. The separate video signals are presented on monitor television receivers and the program director selects, as the action progresses, the video signal which suits him best. A difficulty with this form of program control is the instantaneous nature of the choices which the director must make.

The present invention provides a method and means whereby this selection is facilitated, the director being enabled to view the plural television images being televised by the separate cameras and to compare them before selecting which one shall be transmitted. According to the invention a plurality of video signals derived from separate television pick-up cameras and, preferably, at least one audio signal accompanying the televised action are recorded on one or more closed loop record media which are continuously advanced past recording and playback "heads" or transducers during the progress of the action to be televised. Separate video signal recording and playback transducers are provided for each of the video signals, and similarly separate audio signal recording and playback transducers are provided for each sound signal generated at the scene of the action. Each of the video and audio signals is thus continuously recorded and thereafter continuously reproduced with a time delay which may be of the order of magnitude of a few seconds, although the time delay may be made longer if desired. The time delay is made equal for all signals recorded. Prior to recording, i.e. without delay, the signals are reproduced for the benefit of the program director, on monitor television receivers in the case of the video signals and in loud-speakers or equivalent audio devices in the case of the sound signals. Switching means are provided whereby the program director can select for application to an outgoing video transmission line the video signal of his choice, as reproduced with the above-mentioned uniform delay and whereby if plural audio signals are recorded he may select for application to an outgoing audio transmission line the audio signal accompanying or best suited to the video signal of his choice. A monitor television receiver and sound reproducing apparatus may be coupled respectively to the outgoing video and audio transmission lines respectively to display the signals instantaneously being sent to the television transmitter. In the practice of the invention separate loop-shaped recording media may be provided for each of the video and audio signals available. Alternatively two or more of the available signals may be recorded on a common record medium.

Indeed the invention may be practiced with record media, whether one or more are employed, which instead of being loop shaped take the form of a filament or band transferred from supply to take-up means so that a permanent record may be retained of the various signals generated, including that transmitted over the air.

The invention will now be further described in terms of a number of preferred exemplary embodiments by reference to the accompanying drawings in which.

Figure 1:
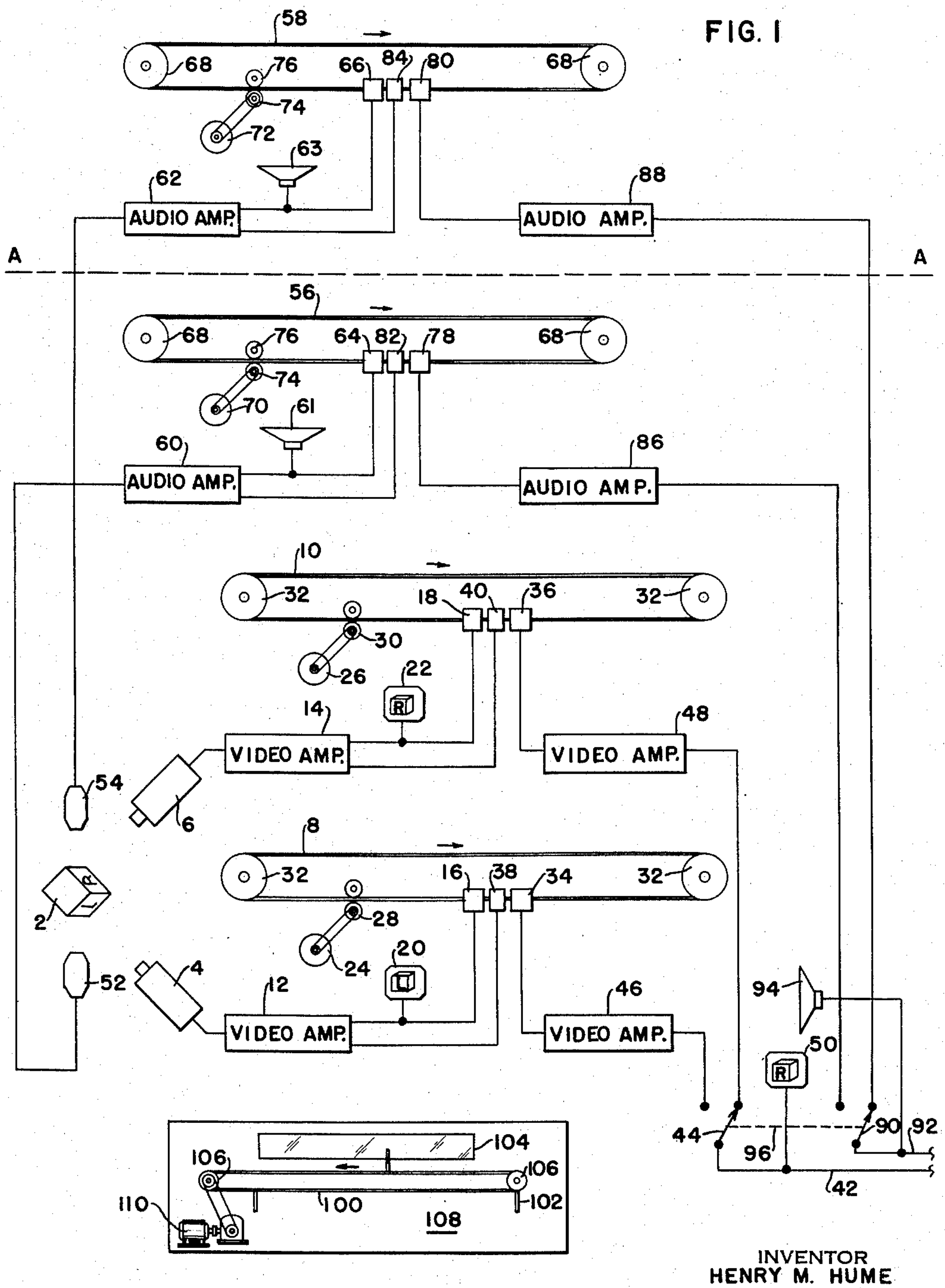
Fig. 1 is a diagrammatic representation of one form of television program control system according to the invention.

In Fig. 1, 2 represents a scene to be televised having separate aspects indicated at L and R. Separate video signals corresponding to the aspects L and R of the scene 2 are generated in television pick-up cameras 4 and 6. The video signal output terminals of cameras 4 and 6 are coupled to separate record media 8 and 10 which are preferably of loop shape as indicated in the figure. The coupling is effected by means of video signal amplifiers 12 and 14 which energize video signal recording transducers 16 and 18. Monitor television receivers diagrammatically indicated at 20 and 22 permit observation of the images instantaneously televised by cameras 4 and 6 respectively. The loop-shaped record media 8 and 10, which may for example take the form of loops of magnetic tape, are driven from motor means 24 and 26 for example by means of driving rollers 28 and 30 which engage the tape media. The tape loops are shown supported on idler pulleys 32. The term "magnetic tape" is here used to indicate a band, usually of paper or the like bearing a coating of suitable material such as the iron oxide powders, on which a record of alternating signals may be made by magnetization of the powder particles. Other types of record media may however be used in carrying out the invention.

Associated with each of the record media 8 and 10 and consequently with the video signal recording transducers 16 and 18 respectively, are video signal playback transducers 34 and 36 which engage the media 8 and 10 at locations down stream, in the sense of the direction of motion of the media, from the recording transducers 16 and 18. In Fig. 1, this corresponds to clockwise sense of travel for the tapes. The arrangement is such that the time required for the tape medium 8 to pass from transducer 16 to transducer 34 is equal to the time required for the tape 10 to pass from transducer 18 to transducer 36. This result is conveniently achieved by making the loops 8 and 10 of the same length, by disposing the recording and playback transducers associated with each at equal separations therealong, and by driving the two loops at the same linear speeds. Such equal linear speeds may be obtained by the use of synchronous motors for the driving means 24 and 26, coupled through similar speed reducing devices to the rollers 28 and 30. The two loops may of course be coupled together to a common driving means.

Means are provided whereby the video signals recorded on the loops 8 and 10 are erased before the material of the loops passes again under the actively recording elements of the transducers 16 and 18. In the figure, erasing transducers 38 and 40 are shown engaging the tape loops between their respective playback and recording transducers. The erasing transducers are energized by suitable sources of high frequency energy supplied from any convenient source, diagrammatically indicated in Fig. 1 as the amplifiers 12 and 14 for the video signals themselves.

The video playback transducers 34 and 36 may be selectively coupled to an output video transmission line 42 by means of a suitable high frequency switch diagrammatically indicated at 44. Switches capable of handling simultaneously the wide range of frequencies which make up a television signal are known, and since the particular form of switch employed is not of the essence of the present invention, the showing thereof in the drawings is diagrammatic only. The video signals re-created in transducers 34 and 36 are raised in amplitude by amplifiers 46 and 48 before being applied to the output video transmission line. A monitor television receiver 50 coupled to transmission line 42 permits observation of the video signal instantaneously sent to the television broadcasting transmitter.

In the embodiment illustrated in Fig. 1 separate microphones 52 and 54 are located at the scene of the action being televised, one adjacent the portion thereof identified as aspect L and the other adjacent the portion thereof identified as aspect R. The audio signals generated in microphones 52 and 54 are applied to loop-shaped record media 56 and 58, again advantageously of the magnetic tape type, via audio amplifiers 60 and 62 and audio signal recording transducers 64 and 66. The audio signals generated at microphones 52 and 54 may be made audible to the program director by means of sound reproducers 61 and 63 coupled to the signal outputs of amplifiers 60 and 62. The audio record loops 56 and 58 are supported on idler pulleys 68 and are driven, again preferably at the same linear speed, by motor means 70 and 72 which operate rollers 74 and 76 engaging the two tapes. With the tapes 56 and 58 there are additionally associated audio playback transducers 78 and 80 and erasing signal transducers 82 and 84, respectively, the latter being shown as energized with signals of superaudio frequency obtained from the amplifiers 60 and 62.

The dimensions of the loop-shaped audio record media 56 and 58 together with the linear speeds at which they are driven by motor means 70 and 72 and the disposition therealong of the recording and playback transducers 64, 66, 78 and 80 are so proportioned that the time delay between the passage of a point on medium 56 from recording transducer 64 until the appearance of that point under playback transducer 78 is the same as the corresponding delay between transducers 66 and 80 for medium 58, both of these delays being equal to the equal delays imposed by record media 8 and 10 on the video signals originating in cameras 4 and 6.

The audio signals recorded on media 56 and 58 are re-created by the playback transducers 78 and 80, from which these signals are fed through audio amplifiers 86 and 88 to an audio frequency switch diagrammatically indicated at 90 where selection is made between them for the application of a single audio frequency signal to an outgoing audio transmission line 92. A sound reproducer diagrammatically indicated at a loud-speaker 94 is coupled to the outgoing audio transmission line 92 for monitoring of the audio signal instantaneously being broadcast.

The video and audio frequency switches 44 and 90 may be advantageously ganged together as indicated by the linkage 96 in order to insure the presentation with the selected video signal of the audio signal which accompanies it.

When the scene being televised is restricted in size, the sound accompaniments thereof may be substantially the same for all of its aspects, in which case a single microphone closed loop recording and reproducing mechanism may be provided to delay the sound signal by the same amount as the video signals from cameras 4 and 6.

The program control system of Fig. 1 includes means to indicate to the program director the phase in the delay interval imposed by the record media 8 and 10 on an element of action observed by him on one or the other of the monitor receivers 20 and 22 and, similarly, on an element of the audio portion of the program reproduced for him by the monitor sound reproducers 61 and 63. In this way it is possible for the program director to judge when he must shift the switches 44 and 90 in order to begin presentation in the output channels 42 and 92 of an aspect of the action which he observes on the monitor receiver 20 or 22 currently disconnected from the output channels. These indicating means comprise an endless belt 100 bearing a plurality of visible indicia 102, shown in the figure as pointers, moving past a stationary scale 104 disposed adjacent the path of motion of the belt. The scale may bear graduations. The belt is supported on pulleys 106 before a panel 108 which also supports the scale 104. The belt is driven at a suitable uniform linear speed by motor means 110.

The pointers 102 are uniformly spaced along the loop length of the belt, which is made an integral multiple of that spacing, and the scale 104 itself possesses the same length as that spacing. The belt is given a linear speed equal to the quotient of the time delay imposed by record media 8, 10, 56 and 58 on signals recorded and subsequently reproduced therefrom, divided by the linear length of the spacing between adjacent pointers 102.

By noting the position along scale 104 of the pointer 102 which happens instantaneously to be in front of the scale at the instant of the action observed by him on receivers 20 and 22 which the program director selects for change-over from one to the other video channel, the director will know that when the next pointer 102 appears at the same phase along scale 104 the element of action in question will have reached the video playback transducer 34 or 36 associated with the record medium on which it was recorded.

Figure 2:
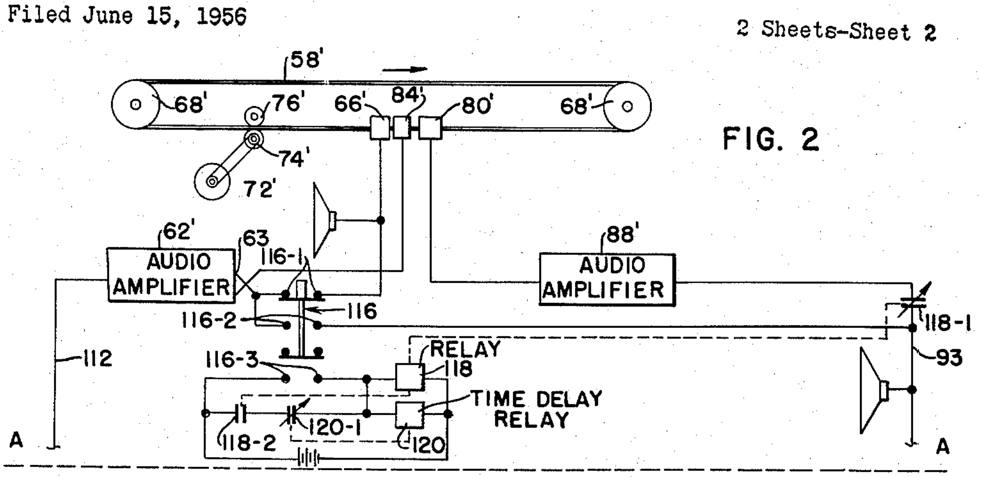
Fig. 2 is a diagrammatic representation of a particular form of audio signal recording and reproducing apparatus combinable with the elements of Fig. 1 below the dash line A—A in Fig. 1 to provide an alternative form of television program control system according to the invention.

Fig. 2 illustrates a modified form of audio signal recording and reproducing apparatus for use with the program control system elements illustrated in Fig. 1, below the dashed line A—A in Fig. 1. The system thus comprising Fig. 2 with those elements of Fig. 1 includes means for handling two separate audio signals although if desired of course the audio signal recording unit of Fig. 1 including record medium 56 may be dispensed with. Indeed the apparatus of Fig. 2 may be employed with a single video signal recording and playback apparatus.

The apparatus illustrated in Fig. 2 has particular utility for example in televising of sporting events or other spectacles wherein the sound element of the televised program is made up to a large extent of commentary from an announcer. With a delay before broadcast imposed upon the video signal or signals representative of the scene televised generated by the cameras, the announcer in such circumstances has an opportunity to view the action before it is broadcast and hence before it can be seen before the television audience. Advantage may therefore be taken of the opportunity presented to the announcer to direct the attention of the television audience in advance to an element of the action about to happen, in the sense of its presentation on the television receivers of the public. The apparatus of Fig. 2 makes possible the injection of such advance notice by an announcer. An audio frequency transmission line 112 connects with a microphone (such as the microphone 54 of Fig. 1) located either at the scene of the action itself or elsewhere, for example at an observation point from which the action is being observed by the announcer. The audio signal applied by the microphone to transmission line 112 is amplified in an amplifier 62′ from which it is applied for the normal position of a multicontact switch 116 to an audio signal recording transducer 66′ and thence to a loop-shaped audio record medium 58′ which may in all respects be similar to either of the record media 56 and 58 of Fig. 1. Switch 116 may advantageously be spring-biased to the position shown in Fig. 2. The apparatus of Fig. 2 in fact includes all of the elements of the audio signal recording and reproducing apparatus associated with the record medium 58 in Fig. 1, corresponding elements of structure being identified in Fig. 2 by the same reference characters as those applied in Fig. 1 but with prime indications.

The audio signal playback transducer 80′ is coupled to a playback amplifier 88′ and thence to an output audio transmission line 93 with however the interposition of a pair of normally closed relay contacts 118—1. If, in the system comprising the apparatus of Fig. 2 in combination with that shown in Fig. 1 below the line A—A, two audio signal record loops are provided, line 93 will connect with a fixed contact of switch 90 of Fig. 1. If only a single audio record loop is provided, line 93 can connect directly with line 92 of Fig. 1.

Switch 116 includes three sets of contacts. A normally closed set of contacts 116—1 couples the audio signal output terminals of amplifier 62′ (diagrammatically indicated at 63) with transducer 66′ whereas a second set of contacts 116—2, normally open, couples when closed the audio signal output of amplifier 62′ directly with the output audio transmission line 93. A third pair of contacts 116—3, normally open, is provided in series with the coil 118 of the relay controlling contacts 118—1. Actuation of switch 116 from the normal position shown in Fig. 2 to that which closes contacts 116—2 and 116—3 consequently diverts the audio signal of amplifier 62′ from the record medium 58′ and applies it directly to the output transmission line 93. At the same time such actuation energizes relay 118, disconnecting amplifier 88′ from line 93 so that the sound signals recorded on medium 58′ and regenerated in transducer 80′ are no longer connected to the audio output of the system. Relay 118 carries an additional pair of normally open contacts 118—2 connected in series with a time delay relay 120 and a pair of normally closed contacts 120—1 thereof across the source of control voltage for relay 118. Energization of relay 118 by even instantaneous actuation of switch 116 accordingly closes relay contacts 118—2 and applies voltage to relay 120. Thus when switch 116 is actuated a holding circuit is established for relay 118 and this circuit is maintained until the delayed energization of relay 120. The delay time for relay 120 is made equal to the delay time imposed by the loop medium 56′ on the audio signals recorded thereon. When the announcer or program director sees on his television monitor receiver an element of action of which he wishes to give advance notice, he actuates switch 116, for example by any suitable remote control means from the location of his microphone at the end of line 112 and makes an announcement of the impending action. The relay control of Fig. 2 then insures that the next sound recorded on medium 58′ presented to the audience will be that occurring at and after the time of actuation of switch 116.

Figures 3, 4:
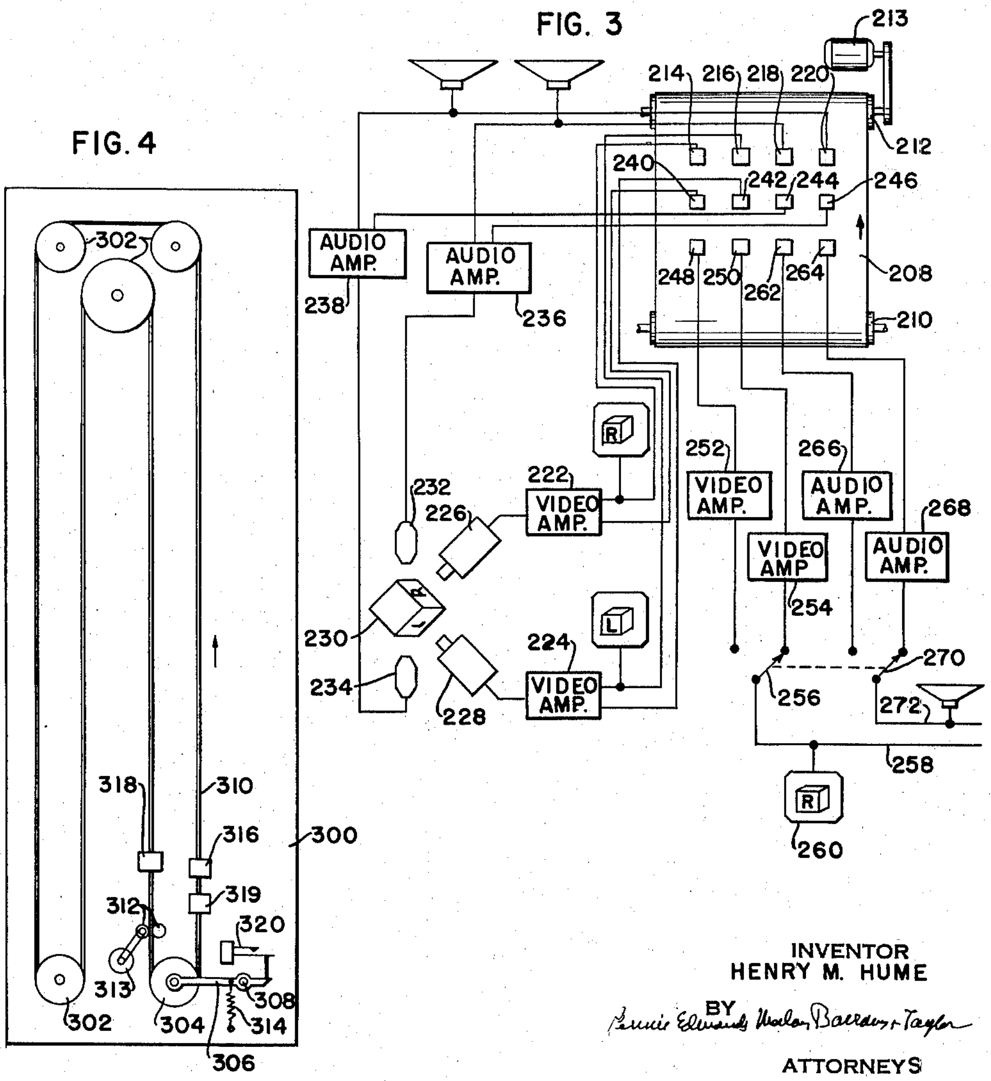
Fig. 3 is a diagrammatic representation of another form of television program control system according to the invention.
Fig. 4 is a diagram representing a particular form of record medium drive system according to the invention for use in any of the systems of Figs. 1 to 3.

While the embodiments of Figs. 1 and 2 employ separate record media for the separate video and audio signals among which selection is to be made, two or more of these signals may of course be combined on a common record medium. Fig. 3 illustrates an embodiment of the invention in which two video and two audio signals are recorded side by side in parallel tracks on a common record medium. In the embodiment of Fig. 3 this common record medium is shown as a loop

208 of magnetic recording tape supported on pulleys 210 and 212, of which one is driven at uniform speed by any suitable motor means 213. Separate video signal recording transducers 214 and 216 engage adjacent portions of the width of the loop 208 and additional portions thereof are engaged by separate audio recording transducers 218 and 220. Transducers 214 and 216 are coupled via video amplifiers 222 and 224 with television pick-up cameras 226 and 228 for the generation of video signals representative of separate aspects of a scene 230 to be televised. Microphones 232 and 234 generating audio signals representative of the sound accompaniments to these separate aspects are applied through audio amplifiers 236 and 238 to the audio signal recording transducers 218 and 220. Associated with each of the transducers 214, 216, 218, 220 are erasing signal transducers 240, 242, 244 and 246 respectively, energized with suitable alternating current signals, in each case of a frequency higher than the maximum signal frequency to be recorded by the associated recording transducer. Video signal playback transducers 248 and 250 are selectively coupled via video amplifiers 252 and 254 and a video frequency switch 256 with a video output transmission line 258, to which a monitor television receiver 260 may be coupled. Similarly audio signal playback transducers 262 and 264 for reproduction respectively of the signals recorded by transducers 218 and 220 are coupled via audio amplifiers 266 and 268 with an audio selector switch 270, which may be ganged with switch 256 and through which one or the other of the reproduced audio signals is applied to an output transmission line 272. Of course the recording and playback transducers respectively need not be disposed abreast along the record medium. They should however be so disposed that the distance along the path of the loop between each recording transducer and the playback transducer for reproduction of the signals recorded thereby is the same for each pair of associated recording and playback transducers. One or (if two are provided) both of the audio signal recording channels of the apparatus of Fig. 3 may be modified to incorporate the by-pass circuit of Fig. 2.

In view of the relatively high frequency of the components of the video signals to be recorded, it may be necessary to provide for the video signals loop-shaped storage media of considerable length, moved at relatively high linear speed. Fig. 4 illustrates a particular form of tape transport mechanism which may be advantageously employed for this purpose, either in the systems illustrated in Figs. 1 and 2 employing plural record media or in that of Fig. 3 in which all signals are recorded on a common loop.

In Fig. 4 a supporting base 300 bears a plurality of idler pulleys 302 journaled at fixed positions with respect to the base. In addition an idler pulley 304 is journaled in a lever arm 306 pivoted for rotation about a pivot axis 308 which is fixed with respect to the support 300. A tape record medium 310 is strung over the pulleys 302 and 304 and is driven at suitable speed by driving rollers 312 which are turned by a suitable source of power 313. The lever 306 is stressed by means of a spring 314 strung between it and an anchor point on the support 300 in the direction required to maintain taut the tape 310. One or more recording transducers collectively indicated at 316 engage the tape at a distance shortly beyond the position of the pulley 304 in the sense of tape travel and one or more playback transducers collectively indicated at 318 engage the tape shortly before the position of the pulley 304, again in the sense of tape motion. Erasing transducers are shown at 319. In this way the distance traveled by tape elements in passing from the recording transducer or transducers 316 to the reproducing transducer or transducers 318 is made independent of any minor variation or flutter in the length of the total tape, which is adsorbed by the pulley 304 between the reproducing transducers and recording transducers.

If desired, a switch 320 may be provided to be actuated in the event of a rupture of the tape.

While the invention has been described hereinabove in terms of a number of preferred embodiments, various modifications and changes may be made in these embodiments without departing from the scope of the invention itself which is set forth in the appended claims.

I claim:

1. A television program control system comprising a plurality of television cameras, record means for the recording of video signals from each of said cameras, a transducer for each of said cameras arranged to re-create from said record means the video signal applied from such camera to said record means, an output transmission line, and switch means adapted to couple said transducers selectively to said transmission line.

2. A television program control system comprising a plurality of television cameras, record means for the recording of video signals from each of said cameras, a transducer for each of said cameras arranged to re-create from said record means with uniform delay the video signal applied from such camera to said record means, an output transmission line, and switch means adapted to couple said transducers selectively to said transmission line.

3. A television program control system comprising a plurality of television cameras, television image display means coupled to the signal output of each of said cameras, record means for the recording of video signals from each of said cameras, a transducer for each of said cameras arranged to re-create from said record means the video signal applied from such camera to said record means, an output transmission line, television image display means coupled to said transmission line, and switch means adapted to couple said transducers selectively to said transmission line.

4. A television program control system comprising a plurality of television cameras, a record medium for each of said cameras, recording and playback transducers associated with each of said media, means to drive said media at speeds such that the time delay for each in passage from its associated recording transducer to its associated playback transducer is the same, means coupling each of said recording transducers to the video output terminals of one of said cameras, an output transmission line, and switching means adapted to couple said playback transducers selectively with said transmission line.

5. A television program control system comprising a plurality of television cameras, television image display means coupled to the video signal output of each of said cameras, a record medium for each of said cameras, recording and playback transducers associated with each of said media, means to drive said media at speeds such that the time delay for each in passage from its associated recording transducer to its associated playback transducer is the same, means coupling each of said recording transducers to the video output terminal of one of said cameras, an output transmission line, television image display means coupled to said transmission line, and switching means adapted to couple said playback transducers selectively with said transmission line.

6. A television program control system comprising a plurality of television cameras, a record medium for each of said cameras, recording and playback transducers associated with each of said media, means to drive said media at speeds such that the time delay for each in passage from its associated recording transducer to its associated playback transducer is the same, means coupling each of said recording transducers to the video output terminal of one of said cameras, an output transmission line, switching means adapted to couple said playback transducers selectively with said transmission line, and visual means to indicate the instantaneous phase in said time delay.

7. A television program control system comprising a plurality of television cameras, a microphone, video signal record means, audio signal record means, audio signal recording and playback transducers associated with said audio signal record means, separate video signal recording and playback transducers for each of said cameras associated with said video signal record means, means coupling said microphone to said audio signal recording transducer, means coupling each of said cameras to one of said video signal recording transducers, an audio signal output transmission line, means coupling said audio signal playback transducer to said audio output transmission line, a video signal output transmission line, and switching means adapted selectively to couple said video signal playback transducers to said video output transmission line.

8. A television program control system comprising a plurality of television cameras, a microphone, video signal record means, audio signal record means, audio signal recording and playback transducers associated with said audio signal record means, separate video signal recording and playback transducers for each of said cameras associated with said video signal record means, means to drive said record means at such relative speeds that the time delay for each in passing from any recording transducer associated therewith to the playback transducer associated therewith for playback of the signal recorded by such recording transducer will be the same, means coupling said microphone to said audio signal recording transducer, means coupling each of said cameras to one of said video signal recording transducers, an audio signal output transmission line, means coupling said audio signal playback transducer to said audio output transmission line, a video signal output transmissing line, and switching means adapted selectively to couple said video signal playback transducers to said video output transmission line.

9. A television program control system comprising a plurality of television cameras, a microphone, video signal record means, audio signal record means, audio signal recording and playback transducers associated with said audio signal record means, separate video signal recording and playback transducers for each of said cameras associated with said video signal record means, means to drive said record means at such relative speeds that the time delay for each in passing from any recording transducer associated therewith to the playback transducer associated therewith for playback of the signal recorded by such recording transducer will be the same, means coupling said microphone to said audio signal recording transducer, means coupling each of said cameras to one of said video signal recording transducers, an audio signal output transmission line, means coupling said audio signal playback transducer to said audio output transmission line, a video signal output transmission line, switching means adapted selectively to couple said video signal playback transducers to said video output transmission line, and visual means to indicate the instantaneous phase in said time delay, said last-named means including an endless belt, plural indicia disposed at uniform linear spacing along said belt, and means to drive said belt at a speed substantially equal to said spacing divided by said time delay.

10. A television program control system comprising a plurality of television cameras, a plurality of microphones, audio signal record means, video signal record means, separate audio signal recording and playback transducers for each of said microphones associated with said audio signal record means, separate video signal recording and playback transducers for each of said cameras associated with said video recording means, means to drive said record means at such relative speeds that the time delay for passage thereon from each of said recording transducers to its associated playback transducer is the same, means coupling each of said microphones to one of said audio signal recording transducers, means coupling each of said cameras to one of said video signal recording transducers, an audio output transmission line, a video output transmission line, switching means adapted selectively to couple said video signal playback transducers to said video transmission line, and switching means adapted selectively to couple said audio signal playback transducers to said audio transmission line.

11. A television program control system comprising a plurality of television cameras, a plurality of microphones, audio signal record means, video signal record means, separate audio signal recording and playback transducers for each of said microphones associated with said audio signal record means, separate video signal recording and playback transducers for each of said cameras associated with said video record means, means to drive said record means at such relative speeds that the time delay for passage thereon from each of said recording transducers to its associated playback transducer is the same, means coupling each of said microphones to one of said audio signal recording transducers, means coupling each of said cameras to one of said video signal recording transducers, an audio output transmission line, a video output transmission line, ganged switching means adapted selectively to couple said video signal playback transducers and audio signal playback transducers to said video and audio transmission lines respectively.

12. A television program control system comprising means to record plural video signals on a common record medium, separate video playback transducers engaging said medium to re-create each of said video signals, each of said playback transducers being displaced along the path of said medium an equal distance from the point of recording along the path of said medium of the signal to be re-created by such playback transducer, an output video transmission line, and switch means adapted selectively to couple said video playback transducers to said video transmission line.

13. A television program control system comprising means to record plural video signals on a common record medium, means to record plural audio signals on said medium, separate video playback transducers engaging said medium to re-create each of said video signals, separate audio signal playback transducers engaging said medium to re-create each of said audio signals, each of said playback transducers being displaced along the path of said medium an equal distance from the point of recording along the path of said medium of the signal to be recreated by such playback transducer, an output video transmission line, an output audio transmission line, and switch means adapted selectively to couple said video playback transducers and audio playback transducers to said video and audio transmission lines respectively.

14. A television program control system comprising a television camera, a microphone, television image display means coupled to the signal output of said camera, video signal record means, audio signal record means, audio signal recording and playback transducers associated with said audio signal record means, video signal recording and playback transducers associated with said video signal record means, means to drive said record means at such relative speeds that the time delay for each in passage thereon from each of said recording transducers to its associated playback transducer is the same, an output audio signal transmission line, an output video signal transmission line, means coupling said camera to said video recording transducer, means coupling said video playback transducer to said video transmission line, means coupling said microphone to said audio recording transducer, means coupling said audio playback transducer to said audio transmission line, and switching means operable to couple said microphone to said audio transmission line and to decouple said audio playback transducer from said audio transmission line, said switching means including a delay relay having a delay equal to said time delay, said delay relay being energized upon operation of said switching means to hold said audio playback transducer decoupled from said audio transmission line for said time delay.

15. A television program control system comprising a plurality of television cameras, television image display means coupled to the signal output of each of said cameras, record means for the recording of video signals from each of said cameras, a transducer for each of said cameras arranged to re-create from said record means the video signal applied from such camera to said record means, an output transmission line, television image display means coupled to said transmission line, and switch means adapted to couple said transducers selectively to said transmission line.

16. A television program control system comprising a plurality of television cameras, a microphone, video signal record means, audio signal record means, audio signal recording and playback transducers associated with said audio signal record means, separate video signal recording and playback transducers for each of said cameras associated with said video signal record means, means to drive said record means at such relative speeds that the time delay for each in passing from any recording transducer associated therewith to the playback transducer associated therewith for playback of the signal recorded by such recording transducer will be the same, means coupling said microphone to said audio signal recording transducer, means coupling each of said cameras to one of said video signal recording transducers, an audio signal output transmission line, means coupling said audio signal playback transducer to said audio output transmission line, a video signal output transmission line, and switching means adapted selectively to couple said video signal playback transducers to said video output transmission line.

References Cited in the file of this patent

UNITED STATES PATENTS

| | | |
|---|---|---|
| 2,380,392 | Begun | July 31, 1945 |
| 2,561,698 | Hogan | July 24, 1951 |
| 2,690,472 | Boucheron | Sept. 28, 1954 |
| 2,697,746 | Kennedy | Dec. 21, 1954 |

OTHER REFERENCES

"Video Magnetic Tape Recorder"; Tele-Tech and Electronic Industries; May 1954; pages 77, 127, 128 and 129.